Figure 1:
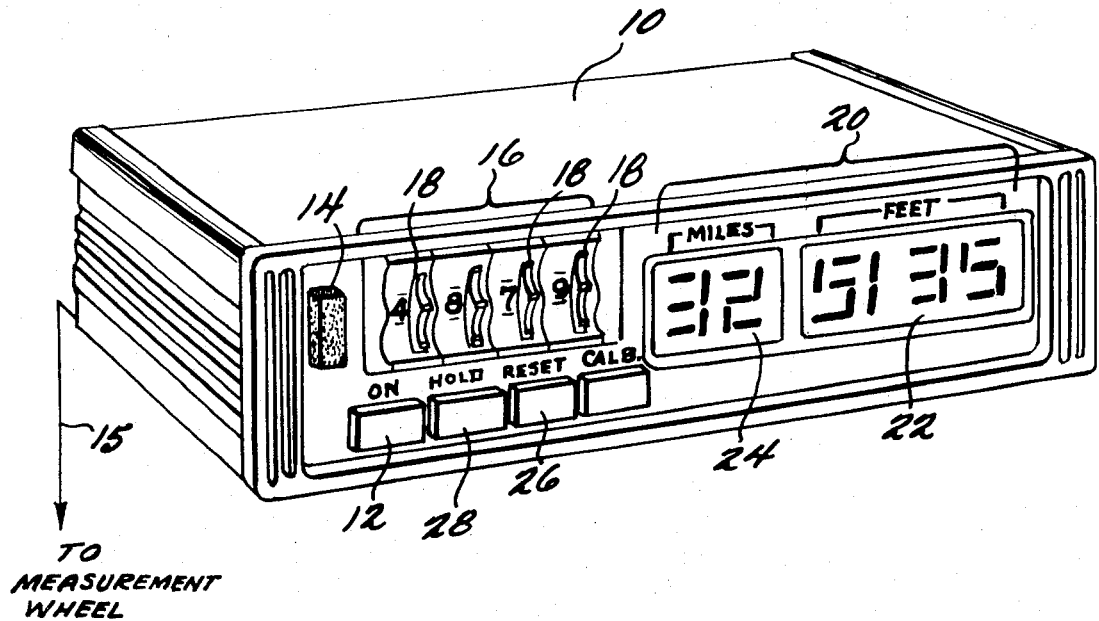

United States Patent [19]
Sampey

[11] 3,865,305
[45] Feb. 11, 1975

[54] PROGRAMMABLE DISTANCE MEASURING INSTRUMENT

[75] Inventor: Harry R. Sampey, Vanderbilt, Pa.

[73] Assignee: Pentron Industries, Inc., Cleveland, Ohio

[22] Filed: Dec. 27, 1973

[21] Appl. No.: 428,700

Related U.S. Application Data

[63] Continuation of Ser. No. 194,401, Nov. 1, 1971, abandoned.

[52] U.S. Cl.... 235/92 DN, 235/92 PE, 235/92 DM, 235/92 R, 324/171
[51] Int. Cl. .......................................... H03k 21/36
[58] Field of Search...... 235/92 DM, 92 DN, 92 PE, 235/92 V, 92 CC, 92 T; 33/141 E, 141 R, 125 M; 324/171

[56] References Cited
UNITED STATES PATENTS

| | | | |
|---|---|---|---|
| 3,601,585 | 8/1971 | Paulsen | 235/92 DN |
| 3,683,159 | 8/1972 | Welch et al. | 235/92 DN |
| 3,708,750 | 1/1973 | Buchs et al. | 235/92 DN |
| 3,748,580 | 7/1973 | Stevens et al. | 235/92 T |

FOREIGN PATENTS OR APPLICATIONS

1,242,770   8/1971   Great Britain

Primary Examiner—Gareth D. Shaw
Assistant Examiner—Joseph M. Thesz, Jr.
Attorney, Agent, or Firm—Cushman, Darby & Cushman

[57] ABSTRACT

An instrument and method for digitally measuring distances or lengths in terms of any desired basic unit of distance measurement which is easily calibrated thereto by programmable switches and which is also capable of providing virtually unlimited measurement accuracy. Apparatus is disclosed for producing electrical "distance" pulses which each represent some arbitrary but approximately fixed increment of distance or length for which a totalized measurement is desired. These distance pulses are input to a programmable control circuit which produces a preselectable number N of clock pulses in response to each distance pulse. The preselectable number N of clock pulses is chosen to represent the magnitude of the arbitrary increment of distance or length in accordance with any desired basic unit of measurement. The gated N clock pulses, are then counted and accumulated to provide a digital data output representing the total measured distance or length which may include any desired number of the arbitrary increments. The instantaneous contents of the accumulator may be displayed for a direct readout of the measured distance in terms of the desired basic units of measurement and/or a digital output may be provided for conventional printing apparatus. The exemplary embodiment also includes circuits for temporarily holding the contents of the accumulator, circuits for resetting the counter circuits to a beginning zero contents and circuits for operating the instrument in a calibration mode wherein the number of distance pulses occurring during a premeasured distance interval can be obtained to facilitate calculation of the required preselectable program number N.

13 Claims, 3 Drawing Figures

3,865,305

PROGRAMMABLE DISTANCE MEASURING INSTRUMENT

This is a continuation of my copending application, Ser. No. 194,401, filed Nov. 1, 1971, now abandoned.

This invention generally relates to distance measuring instruments and in particular relates to an electronic distance measuring instrument which is programmable to provide a digital output representing a measured distance accurately calibrated in any desired basic unit of measurement.

Devices for accurately measuring distances or lengths (i.e., a measure of the separation between two points) have long been in demand. Slight miscalculations in distance measurements often lead to costly product waste and fruitless man-hours in many industries such as the utilities industries in particular. Utilities and telephone companies often have need for accurate distance measurements for use in the installation of cables or pipe lines. The trucking industry often needs accurate distance measurements to determine hauled ton/distance data. Other distance versus time-studies are obviously of use for public transportation companies, the automobile industry and others.

Furthermore, any industry that manufactures products in any linear form may find use for such an instrument to retrieve precise linear measurement information. Extrusion or roll-forming plants are an obvious example of such industries.

Of course, instruments for electronically measuring distances or lengths have been proposed before. U.S. Pat. No. 3,477,022 — LeMasters; U.S. Pat. No. 3,530,382 — Liston et al and British Pat. No. 1,053,444 — Moss are all representative of typical prior art approaches to the electronic measurement of distances. However, these prior art approaches have somewhat limited utility in that any given instrument constructed according to these prior art teachings will measure distances in only one basic unit of measurement and will be critically dependent upon prior knowledge of the exact physical distance represented by each "distance" pulse before a device can be designed to provide measurements in even one basic unit of measurement.

However, it is often desirable to obtain precise distance measurements in different basic units of measurement. For instance, we, in the United States use the so-called English system of measurement which utilizes inches, feet, yards and rods. Scientists even in this country and layman in most other countries utilize the metric system which includes basic units such as meters and kilometers, etc. Other linear units of measurement are also possible and as example it may be remembered that large distances are usually expressed in the English system in terms of a "mile" which represents 5,280 feet. Other possible basic units of measurement are paces, cubits, fathoms, etc.

With this invention, a single instrument may be utilized for measuring distances in terms of all these or of any other desired basic units of measurement. All that is required to perform distance measurements in any given basic unit of measurement is to properly set a programmable control in the invention to represent each arbitrary increment of distance (represented by a "distance" pulse) in terms of the desired basic unit of measurement by a preselected number N of clock pulses. The increment of distance actually represents the distance traversed during a time interval between the sensing of index marks on a wheel which is adapted to travel along the distance or length for which a measurement is desired. The N clock pulses are then counted and accumulated to obtain a total distance measurement for any number of sensed increments.

Easy-to-install targets are adhered to a wheel in contact with the measuring surface. Example: front wheel of a motor vehicle. The moving targets cause pulses to be created in a sensing device installed near the targets. These measurement "sensor" or "distance" pulses are conveyed to the instrument via an electrical cable and transferred to digital readout information. A four digit display records measurement information up to 5,280 feet, whereupon, that accumulation is converted to a digital readout of 1 mile .0000 feet. Continuing motion records footage until 5,280 is again reached and the display is then transferred to 2 miles. Maximum digital readout accumulation is 99 miles/5,279 feet. (100 miles) The extreme measurement accuracy of the instrument necessitates individual vehicle or instrument calibration. To do so, one may first plot a 1,000 ft. measurement along a highway or other smooth surfaced payment. The vehicle instrument is then reset to 0 and placed in a calibrate mode before being traversed over the premeasured distance. The resultant measurement readout information is then used to program digital wheel switches by calculation or reference to a calibration chart. Example: after traversing over premeasured distance, a reading 001349 is given. The thumb wheel is set at 741 and the distance is retraversed to verify the programming.

The exemplary embodiment has four basic push-switch control functions, plus the four programmable thumb wheel switches: (1) On/off, (2) Calibrate, (3) Reset and (4) Hold.

To perform a distance measurement, the vehicle is aligned at the starting point at rest or in motion. The reset switch is momentarily depressed, establishing a zero readout. As each foot of distance is traversed, the instrument records and displays each foot and accumulates the input data. When the desired distance is traveled, the memory or hold switch is depressed, holding in display the recorded number in feet and mileage.

Installation of the instrument with an appropriate sensor will vary, depending on the application. In mobile vehicle use, the mounting of the sensor and instrument are quite simple. The instrument is designed with a mounting bracket that will easily attach to the underside of the vehicle's instrument dash panel. The wiring harness is connected to appropriate electrical sources as will be apparent. A velocity sensor is then mounted in an appropriate fixed location near the steering arm ball joint and positioned in such a manner that the target sensors pass by the head by about .25 inches. Eight targets are positioned with a self-adhesive material every 45° around the inner area of the wheel rim and adjusted inwardly so their movement past the sensor are in line and within .25 inches. As the wheel rotates, the targets pass by the sensor head. The targets remain fixed in their installed position by centrifugal forces. Two sensors are preferably available to permit infrared optic scanning and/or electromagnetic scanning. The optic scanning sensor may be used where dirt is not a problem. For adverse operation, the electromagnetic scanner is recommended. Most of the required circuitry belongs to a family of conventional counting circuits. The display counting chain consists of basic binary counters. Since no storage is required, the BCD output of each counting element may be directly coupled to the display decoder-driver. The number, 5,280, representing the number of feet in 1 mile, coincides with the next clock pulse to form one input pulse for the mileage counter and at same instant, resetting the four least significant feet display digits forming 5,280.

It is assumed that the distance between individual "distance" can vary between .5 ft. to 2 ft. Because this measurement increment is not a constant value from one vehicle to the next, a means is provided for calibrating the instrument. Therefore, as each pulse from the signal transmitter is received, a control and counting gate allow a preselected number of clock pulses to be directed into the accumulator counter, which will add pulses up to 1,000 and then transmit a carryover pulse representing integral or whole numbers of feet into the display counters.

As noted, changing the digital program will alter the input information. Therefore, to combat fradulent alteration of the program, the instrument can be equipped with a conventional on/off locking device.

The exact operation of this programmable control means will become more apparent in the detailed discussion given below. However, in brief summary, the programmable feature is achieved in this invention by preselecting a particular number N of clock pulses for each of many sensed arbitrary (but approximately equal and fixed) increments of distance where the preselected particular number N represents the magnitude of one average arbitrary increment in accordance with the desired predetermined basic unit of measurement. Thus, by merely setting a plurality of program switches to appropriately select the required number N of clock pulses, the instrument will read out the measured distance in terms of any desired basic unit of measurement.

This programmable feature is also of value in precisely calibrating the unit with respect to operation using a unique or particular input apparatus which may produce "distance" pulses for a slightly different arbitrary increment of distance or length. That is, a distance pulse may nominally represent an X increment of distance when utilized with a vehicle having tires (one of which is utilized as the measuring wheel) of given dimensions and would then represent a different Y increment of distance or length when utilized in conjunction with a measuring wheel having different dimensions as should be apparent. However, by properly calibrating the instrument with the programmable control apparatus, those variables which are peculiar to a particular unique measuring wheel may be compensated at the same time that the instrument is being programmed to present distance measurements in a desired unit of measurement as will become more apparent in the following discussion.

Figure 2:
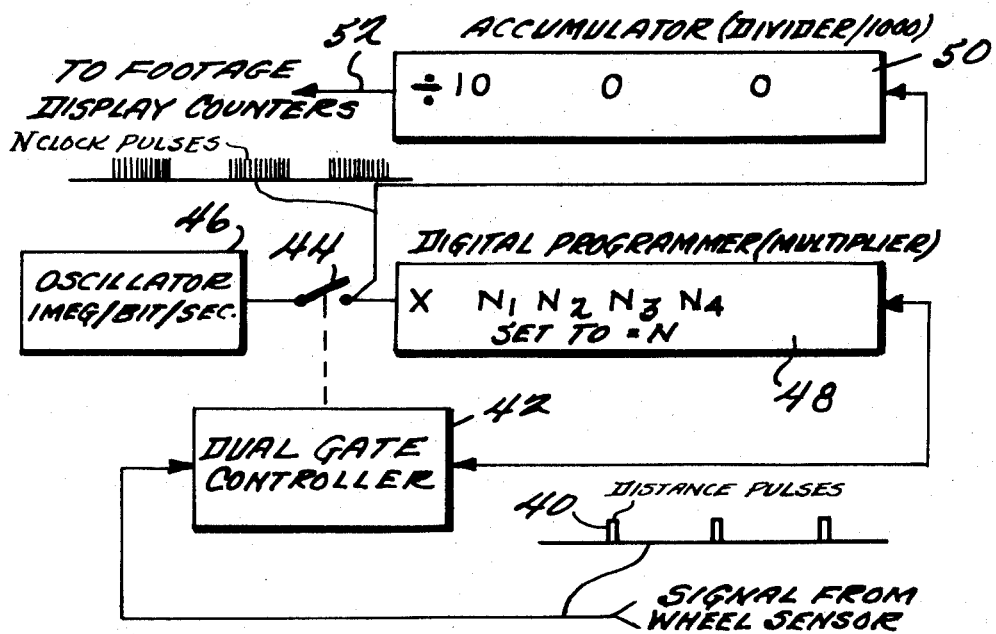
Figure 3:
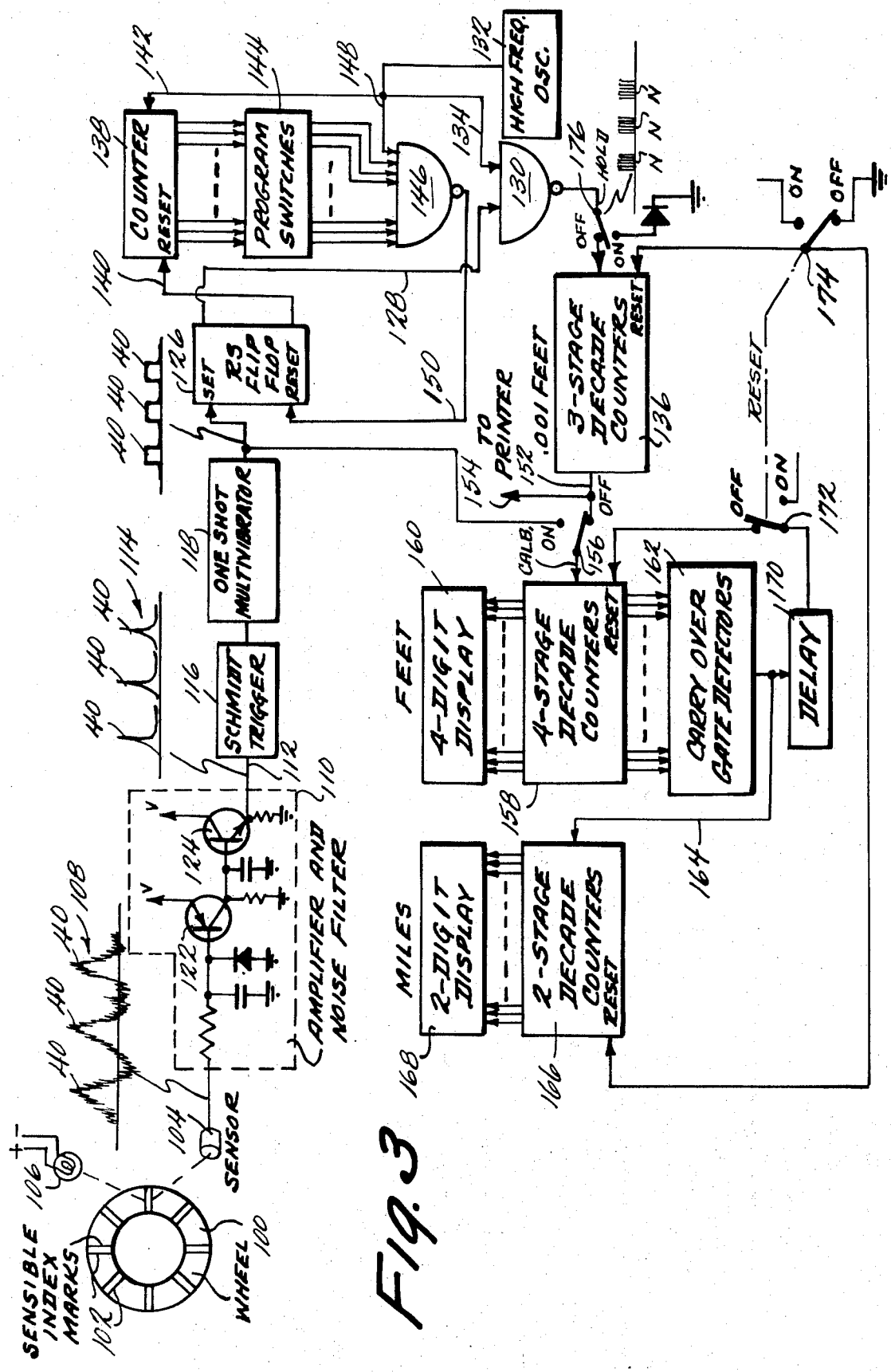

These and other objects and advantages of this invention will become more fully apparent from the detailed description which follows, in which:

FIG. 1 is an exemplary pictorial representation of the major portion of an assembled distance measuring instrument constructed according to this invention, FIG. 2 is a simplified block diagram of some of the basic components of this invention, and FIG. 3 is a more detailed schematic and block diagram of an exemplary embodiment of this invention.

As shown in FIG. 1, the major portion of the distance measuring instrument is housed within a casing 10 which may be easily adapted for fitting under the dash of a motor vehicle if desired. An On/Off power switch 12 is provided for applying power to the circuits of the instrument and its ON or OFF state may be directly indicated by a light indicator 14 as should be apparent to those in the art.

While the basic processing, calculating and display circuitry is housed within casing 10, there would, of course, be connections 15 to a measuring wheel sensor, etc., as will be explained below. However, it is contemplated that for large fleets of company vehicles, such measuring wheel sensors, etc., could be permanently affixed to wheels in many vehicles and that a fewer number of processing circuits 10 could then simply be moved from one vehicle to another as required with connections to the sensor being made over cable 15. As will be seen, calibration to compensate for slight differences in the input sensors, etc., may be easily accomplished.

A set of program switches 16 is provided wherein the operator of the instrument may dial thumb wheel switches 18 until an appropriate number N is registered indicating that the program switches have been set to select a predetermined number of N clock pulses. As shown in FIG. 1, the program switches have been left at a setting which indicates that 4,879 clock pulses will be gated in response to each sensed distance pulse. In the exemplary embodiment, each such gated clock pulse represents .001 of the basic unit of measurement, which is, in the explanatory case, the English unit of measurement known as a foot. Thus, the distance pulses should occur at intervals of 4.879 feet if the readout on indicators 20 is to be accurate. The indicators 20 comprise a first indicator 22 which displays the number of accumulated feet and a second indicator 24 displaying the number of accumulated miles.

To begin any given cycle of measurement operation, an operator first actuates the reset switch 26 which resets all the counters in the device to a starting or zero contents and thereupon begins a distance measurement from that point. When the end of the desired distance measurement period occurs, the operator may either stop further movement of the measurement wheel itself to hold the contents of the indicators 20 at the proper value or he may actuate a "hold" switch 28 which will effectively perform the same function in maintaining the contents of indicators 20 at their then existing values so that a final reading of the total measured distance may be made by the operator.

The distance pulses 40 shown in FIG. 2 represent pulse signals which are initially generated from a measuring wheel sensor source. That is, a wheel adapted to travel along the distance or length for which a measurement is desired is also adapted to trip a sensor at given arbitrary intervals corresponding to increments of distance actually traveled by that measurement wheel (assuming no wheel slippage). Accordingly, each occurrence of a distance pulse 40 represents the information that the measurement wheel has now traversed an additional increment of distance. Preferably, sensible index marks will be located at equal angular intervals about the measurement wheel such that the passage of each index mark next to an appropriate sensing device to produce a single distance pulse will represent the traversal of an equal increment of distance. However, it is not absolutely necessary that this be the case where relatively large distances are measured involving many rotations of the measurement wheel. In this instance, each distance pulse may represent a slightly different incremental distance but on the average each distance pulse will still represent approximately the same distance increment and over many measurement cycles such small cyclically recurring differences between the individual sensed distance increments will average out. Therefore, for practical purposes one may think of each distance pulse as representing that an approximately equal increment of distance has been traversed by the measurement wheel.

The distance pulses 40 are input to a dual gate controller 42 to operate gate 44 connecting the output of one megahertz oscillator 46 to the input of both the digital programmer or counter 48 and the accumulator or counter 50. The digital programmer 48 will have been previously preset to a particular number N and when this number of clock pulses from oscillator 46 have been counted by counter 48, the dual gate controller 42 is caused to open gate 44 thus preventing any further clock pulses from being input to either counter 48 or counter 50. At the same time, a reset pulse is applied to counter 48 to reset it to a beginning or zero contents in preparation for the next cycle of operation which will occur whenever the next distance pulse 40 is presented to the dual gate controller 42.

As will be appreciated by those in the art, the just discussed sequence of events will have resulted in exactly N clock pulses being passed to the input of both counters 48 and 50.

Assuming that the number N has been chosen to represent the number N of .001 fractional part of the chosen basic unit of measurement in the arbitrary increment of distance represented by each distance pulse 40, then the output of counter 50 (actually a divider by the factor of one thousand) accurately represents the number of integral basic units of the chosen distance measurement. That is one pulse at the output 52 represents one of the chosen basic distance unit measurements. In the exemplary embodiment discussed herein the basic unit of measurement is the foot and, as depicted in FIG. 2, the output 52 from the accumulator 50 is passed on to footage display counters as will be more apparent below. Of course if the contents of counter 50 were displayed, the fractions of the basic measurement unit would be presented.

In other words, using the exemplary embodiment wherein the English system of units are utilized and the exemplary situation depicted in FIG. 1 whereby the digital programmer 48 has been preset to gate 4,879 pulses in response to each distance pulse 40, it will be seen that the number N equals 4,879. Thus, the arbitrary increment of distance represented by each distance pulse is 4.879 feet and for each distance pulse presented to the dual gate controller 42, 4,879 pulses will be gated to the accumulator or counter 50. Accordingly, for each distance pulse 40 there will be at least four output pulses on line 52 for passage to the footage display counters. Depending upon the contents of the counter 50, one distance pulse may result in five output pulses at 52.

For instance, if the reset button 26 has just been actuated and all of the counters are initially set to zero, it will be seen that the first distance pulse 40 presented to the dual gate controller 42 will result in four output pulses on line 52 and a remaining contents of 879 in the accumulator 50. Thereafter, the second distance pulse 40 presented to dual gate controller 42 will cause another 4,879 clock pulses to be input to the accumulator 50. Therefore, this second distance pulse 40 will result in five output pulses on line 52 with a remainder of 758 remaining in the accumulator 50. The third distance pulse 40 will again cause five output pulses on line 52 and result in a remaining contents of 637 in accumulator 50. The fourth distance pulse will also result in output of five pulses on line 52 with a remainder of 516. The operation for succeeding distance pulse should not be apparent to those in the art.

Some of the advantages of this invention should now become apparent. For instance, if the tire on the measuring vehicle were slightly changed in dimensions such that the incremental distance represented by each distance pulse 40 were changed to some other figure such as 4.250 feet, the instrument can be easily adapted to continue providing accurate readout in spite of this change by recalibrating the instrument. That is, the thumb wheel switches 16 need merely to be repositioned to cause the gating of 4,250 pulses for each distance pulse presented. Furthermore, if a readout in terms of meters or some other basic unit of measurement is desired rather than a readout in terms of feet and miles, then one merely has to reset the thumb wheel switches 16 to cause the number N to correspond to the number of .001 fractions of the desired basic unit of measurement represented by each distance pulse. For instance, if the program wheels had been set at 1,507, the output on line 52 to the footage display counters would represent one pulse for each meter of distance traveled (for the example shown in FIG. 1) so that the display counters would have accumulated a count corresponding to the number of meters traveled rather than to the number of feet. Of course, indicator 24 (which in the exemplary embodiment represents an indication of miles) would not normally be used in this case since it would represent multiples of 5,280 meters in this instance unless some other slight changes are made as will be discussed below.

To slightly restate the basic operation of the instrument, with the four digit program switch 16, zero thru 9,999 pulses can be obtained for each sensor input pulse (i.e., "distance" pulse). The controlled clock pulse group or train leaving the program register is fed thru the accumulator divider 50 which will divide the number of pulses entering by 1,000 before it presents them to the readout counters for display. Thus, if the number 10 is set on the thumb wheel switch 16, 10 pulses will be passed to the accumulator for each sensor input pulse, but it will take 100 (10 × 100 = 1,000) sensor pulses before the accumulator will pass a 1 to the readout counter for display. If 8,389 were set on the thumb wheel switch 16, then each sensor input pulse would create a train of 8,389 pulses to the accumulator, which, in turn, would feed eight pulses per sensor input pulse to the readout counters for a display of eight for one sensor input pulse, and the remainder of 389 held in the accumulator to be added to the next series of gated clock pulses.

As should now become apparent, accuracy is only limited by the distance between sensor pulses versus the selected basic unit of measurement.

If the readout is desired to be displayed in inches, for example, one or more sensor pulses will be needed per inch of measurement for accuracy of ± 1 inch. It should now be apparent that the accumulator accuracy is proportional to the number of pulses per smallest unit of measurement being displayed.

To better define the program number N required for presetting programmer 48, let Y = number of sensor pulses per traveled foot distance. Then Y × 1,000 = N and this number should be set into the program switches 16 to cause readout in feet.

For example if there are five target pulses available per foot of measurement, and a display in inches is desired, then this is equal to 12/5 inches (2.4 inches) or 5 pulses/foot. N = 2.4 × 1,000 = 2,400 which should be set into program register 16. Thus, every sensor input pulse will pass a train of 2,400 pulses to the accumulator, which, in turn, will transfer a "2" to the readout counters for display and it will store the ".4" until the next sensor pulse fires a train to fill the accumulator again. Displayed readout accuracy is then ± 2 inches total for as long as sensor input pulses are being continuously received.

As another example, if there are 15 target pulses available, instead of five for each foot of measurement and, again, the desired readout display is in inches, there are 12/15 (.8 inches) per target or 1.25 pulses per inch. So N = 0.800 × 1,000 = 800 to be set in program register. Each sensor input pulse would fire 800 clock pulses to the accumulator representing 0.8 inches, which would not be displayed until the next input pulse, which, again, would fire another train of 800 pulses to the accumulator, giving us a total of 1.6 of which the "1" would be displayed while the ".6" would remain in the accumulator waiting for the next train of gated clock pulses.

Thus, the number set in the program thumb wheel switches 16, in a sense, has a "floating decimal" whose location is dependent on the desired unit of measurement and/or number of available sensible targets.

There are certain error characteristics that occur when making measurements from a vehicle. Knowledge of these generated errors, although small, should be recognized and prevented.

Assume that measurements are being made in feet, and the preset program number is 0826. From previous explanations, this number actually represents the distance between each sensing target in thousandths of a foot. Therefore, 0826 is .826 of a foot. Since knowledge of the targets' initial position in relation to the sensor is unknown, the maximum start error must be .826 ft. or less. The same must also be true at the completion of the measured course. Of course, this will be the maximum error, but in actual measurement, this error tends to neutralize to an average of less than .826 ft. This type of error can be greatly reduced, if desired, by simply adding more targets to the measuring or sending wheel thereby reducing the distance between individual targets and hence the maximum error.

There are two other conditions that affect the accuracy of measurement: tire pressure and vehicle speed. The acceptable tolerances for variations in these two conditions are quite broad, but knowledge of these variables and compliance to predetermined charted ranges will provide accurate measurements each time if the calibration is made using such ranges.

Tire pressure can vary several pounds without seriously affecting accuracy. Speed can vary ± 5 MPH from calibrated speed with very little effect on accuracy. Tires having stiffer walls will obviously provide a greater degree of consistency. As the speed of a sensing tire is increased, a thin wall tire will expand, becoming slightly larger in diameter. A stronger wall tire will maintain a more rigid state and be less subjected to increasing centrifugal forces.

Making accurate measurement is a simple task of maintaining tire pressure within two pounds and varying no more than ± 5 MPH from the speed for which the instrument was calibrated.

As mentioned earlier, the exemplary embodiment is internally adjusted to express measured distance in feet and miles. This design will transfer automatically accumulated feet to miles upon reaching a display total of 5,280 feet. When making measurements in units other than feet, it should be noted that no number in the footage counters can ever exceed 5,280.

Some of the previous discussion has involved performing calculations based on the diameter of the sensor wheel to determine the program number N. This is not necessary for the instrument when mounted in a vehicle. By placing the instrument into the "Calb." mode, each passing target is recorded without any arithmetic computations. This convenience allows the operator to travel a premeasured course (preferably 1,000 ft.) and record the number of targets received over this distance. Knowing the number of targets for 1,000 ft., a conversion chart may be referenced for determining the proper setting of the programmer. Basically, the conversion table should have computed: number of sensors received per thousand feet divided into 1,000 ft. The result is a number actually indicating the average distance (in thousandths of 1 foot) between each sensor target. Naturally, one may elect, for calibration purposes, to traverse only 100 ft. Of course, the number of targets per 100 ft. should be multiplied by 10 and divided into 1,000. Greater accuracy will result using a long distance course for calibration, such as 1,000 feet.

A more detailed showing of an exemplary embodiment of this invention is given in FIG. 3. Here a measurement wheel 100 is provided. This measurement wheel is adapted for circumferential travel over the distance or length for which a measurement is desired. For instance, the wheel 100 might in fact be a front wheel on an automotive vehicle traveling over a section of road for which a measurement is desired.

At regular intervals about the wheel 100, sensible index marks are affixed. In the exemplary embodiment, these sensible index marks are located every 45° about the wheel 100. The sensor 104 will be mounted in a position that is relatively fixed with respect to the vehicle upon which the wheel 100 is mounted or upon some other structure attached to the axle of wheel 100 as should be apparent to those in the art. Each passage of an index mark 100 will then represent one-eighth of the circumferential distance along the circumference of the tire assuming no tire slippage, as should be apparent.

The accuracy of the device may be increased to virtually any desired degree by merely increasing the number of index marks 102. The index marks may be of any conventional sensible variety such as light reflecting tapes, etc., or magnetically sensible devices as will be apparent to those in the art. In the exemplary embodiment shown in FIG. 3, a light source 106 is provided to insure illumination of each light reflecting sensible mark as it passes by a photosensor 104. Of course, if ambient illumination is sufficient, then the light source 106 may be obviated. Alternatively, infrared light sources and sensors may be used to eliminate dependence upon ambient fluctuations.

As shown in the waveform 108, which gives an exemplary representation of the distance pulses 40, each distance pulse 40 represents approximately one-eighth of the distance about the circumferential of wheel 100 as should now be apparent. Of course, the signal directly coming from the sensor 104 will probably be of relatively low amplitude and may be influenced by noise signals, such as may be generated by a vehicle's ignition system, etc. Therefore, an amplifier and noise filter stage 110 is provided. Those in the art will recognize this as essentially comprising two stages of amplification together with capacitors for suppressing RF noise and a diode for clamping negative excursions of the signal. The output at 112 is then shown in representative form as waveform 114 wherein most of the noise has been eliminated from the distance pulses 40 and the pulses are of sufficient amplitude to drive the remaining circuitry. Thereafter, a conventional Schmidt trigger 116 is utilized to detect the distance pulses 40 which rise a predetermined amplitude above a base level and the output from Schmidt trigger 116 is then input to a one-shot multivibrator 118 which produces uniform distance pulses 40 as shown at waveform 120 for input to the control means of the exemplary embodiment which will be explained in detail below.

The components in the amplifier and noise filter 110 and the Schmidt trigger 116 and one-shot multivibrator 118 are all conventional components which will be recognized by those in the art. For instance, transistor 122 may be a 2N3905 transistor while transistor 124 may be of the type 2N3904. The Schmidt trigger 116 may be fashioned from onehalf of a conventional type 96L02 integrated circuit while the one-shot multivibrator 118 may be fashioned from the latter half of this integrated circuit as will be apparent to those in the art.

Each thus processed distance pulse 40 is input to the "set" input of an $\overline{RS}$ flip-flop 126 and accordingly, each distance pulse 40 will result in "setting" the $\overline{RS}$ flip-flop to a first "set" state which causes an enabling output on line 128 to gate 130 thus permitting clock pulses from the high frequency (1Mhz) oscillator 132 to pass along line 134 through gate 130 into the input of the accumulator 136 which comprises three cascaded stages of conventional decade counters.

At the same time the enabling output on line 128 is presented to gate 130 (thus permitting clock pulses to pass into the accumulator 136), the program counter 138 is enabled by the change in state of $\overline{RS}$ flip-flop 126 which removes a disabling voltage from line 140 thus permitting the counter 138 to respond to the high frequency clock pulses over line 142 and to begin counting from a beginning or zero contents. The program switches 144 are connected to the outputs of each stage of counter 138 (comprising four stages of conventional decade counters) to permit any desired predetermined number N to be preselected by the setting of program switches 144 as should be apparent to those in the art.

Accordingly, when the contents of counter 138 coincides with the setting of program switches 144, the inputs to gate 146 will be such as to enable this gate to pass the next clock pulse presented on line 148 over line 150 to reset the $\overline{RS}$ flip-flop 126. The resetting of $\overline{RS}$ flip-flop 126 causes a disabling voltage to reappear on line 140 thus resetting the counter 138 to its initial zero contents. At the same time, this transition of $\overline{RS}$ flip-flop 126 removes the enabling voltage on line 128 to gate 130 thus stopping the passage of clock pulses to the accumulator 136. As should now be apparent, N clock pulses will have been passed to the input of the accumulator 136 as a result of one distance pulse 40 being presented to the "set" input of $\overline{RS}$ flip-flop 126.

The frequency of the clock pulses is not too crictical as long as the frequency is relatively high compared with the expected frequency of distance pulses 40. That is, there must be time between each pair of distance pulses 40 to pass the maximum possible number of clock pulses which may be required to represent the basic desired unit of distance measurement. In the exemplary embodiment, the high frequency oscillator 132 operates at approximately one Mhz in frequency and may be constructed from a conventional integrated circuit type 9L00 as will be apparent to those in the art. The counter 138 in the exemplary embodiment comprises four decade counters, each decade counter comprising an integrated circuit type 7490 as will be apparent to those in the art. The binary coded decimal output (four lines) from each of the decade counters in counter 138 is then connected to one of the program switches 144 such that by properly actuating the program switches, any desired number N may be represented thereby. When all the outputs from the various stages of counter 138 which have been selected by the program switches 144 are actuated, the inputs to NAND gate 146 will enable that gate to effectively pass the next clock pulse presented thereto over line 148 as should be apparent to those in the art. The NAND gate 146 may comprise part of integrated circuit type 7430 and the NAND (NAND gates could also be used if the circuit is properly designed as should be apparent) gate 130 may comprise part of an integrated circuit type 9L00. The $\overline{RS}$ flip-flop may also be a part of a conventional integrated circuit type 9L00 as should be apparent to those in the art.

As should be recognized, the important function of $\overline{RS}$ flip-flop 126, counter 138, program switches 144, oscillator 132 and NAND gates 146, 130 is to effectively "multiply" each distance pulse 40 into N clock pulses for input to accumulator 136. This could be accomplished in other fashions. For instance, counter 138 could be preset each cycle so that N further input pulses would cause a full capacity contents thus producing an overflow or carryout pulse that could be used to control gate 130. Furthermore, coincidence gating circuitry could be used to detect a preset N contents of counter 138, etc. Still other techniques will no doubt now be apparent to those in the art for obtaining the N clock pulses for each "distance" pulse 40.

To obtain high accuracy with this invention, each clock pulse should be selected to represent a relatively small part of the basic unit of measurement. In the exemplary embodiment, each clock pulse represents .001 foot (or other basic unit); however, it should now be apparent that any other fractional part of the basic unit of measurement could also be utilized if desired. In any event, unless a fractional readout is desired for the basic unit of measurement, an accumulator stage 136 should be provided for accumulating clock pulses until an integral unit of measurement has been measured as represented by a predetermined number of clock pulses. In the exemplary case, 1,000 clock pulses indicate that an integral foot (or other basic unit) has been measured and thus the accumulator 136 in the exemplary embodiment comprises three stages of decade counters which operate in the conventional fashion to count 1,000 pulses before providing a carryover output pulse on line 152 as should be apparent.

In any event, if the clock pulses are appropriately chosen to represent $1/X$ of the basic unit of measurement, then the accumulator 136 should be designed to count $X$ clock pulses before providing a carryout signal on line 152 and then resetting itself to begin counting again. As will be apparent to those in the art, this function can easily be achieved for any desired number $X$. The output pulses or carryout pulses on line 152 represent integral units of the basic distance measurement unit as determined by the setting of program switches 144. Accordingly, an output may be taken at 154 and directly fed to conventional printing apparatus or display apparatus designed to accept a sequence of pulses and to print or otherwise display the number represented by the sequence of pulses.

In the exemplary embodiment of this invention, the output on 152 representing integral units of the basic distance measurement unit is passed through switch 156 to the input of a further counter 158 comprising four cascaded stages of conventional decade counters. Thus, the contents of counter 158 will directly represent the number of feet measured by the instrument. Of course, if the program switches 144 are properly set then the contents of the counter 158 will represent any other basic unit of measurement as should now be apparent. Contents of the decade counters 158 may be directly displayed in conventional display devices 160 as should be apparent to those in the art.

In addition, for unusual measurement systems (such as the English system) which utilizes peculiar multiples of the basic unit of measurement as yet another but larger basic unit of measurement (such as the mile), a "carryover" gate detector 162 may be connected to appropriate stages of the decade counters 158 to detect a predetermined contents of the decade counters 158 corresponding to this peculiar multiple of the basic unit of measurement.

For instance, in the exemplary embodimemt, the three highest order stages of decade counters in counter 158 may be appropriately wired to a gate 162 to detect a contents of 5,280 whereupon a carryover pulse is presented on line 164 to an input of a further series of decade counters 166 which are utilized to accumulate the larger basic unit of measurement, such as the mile. Further conventional display apparatus 168 may be connected to this counter 166 to directly display the contents thereof which indicate the accumulated number of miles. The carryover output on line 164 is also input to a slight delay unit 170 (to prevent possible race conditions) before then passing through switch 172 to reset the decade counters 158 to their initial or zero contents so that counting for another 5,280 feet may then begin upon the next input pulse through switch 156. Of course, if a metric system of measurement is being contemplated, then more stages could be added to counter 58 while counter 166 could be eliminated. Alternatively, the metric system could be made a special case of the peculiar multiple systems by connecting carryover gate 162 to respond to 10,000 as should be apparent. A switch might control the mode of gate 162 so that one instrument could respond to both the English and the metric systems of measurement.

The counters 136, 158, and 166 may all be reset to a zero contents at the beginning of a measurement cycle by operating ganged switched 172 and 174 from the OFF to the ON positions thereby temporarily ungrounding the reset connections to these counters and causing the counters to be reset. Of course, if different types of counters are utilized which require other kinds of reset signals, the reset switches 172 and 174 could be changed appropriately, as should be apparent, to provide the required reset signals.

The decade counters, display units, gates and delays utilized in the exemplary embodiment of the accumulator means are all conventional devices. For instance, each stage of the decade counters may be constructed from a conventional integrated circuit type 7490. Each decade counter in counters 158 and 166 may be connected to a display unit comprising a seven segment BCD decoder commonly available as conventional integrated circuits type 9317 or 7447. The gates in the carryover gate detector 162 and the delay (which may actually be provided by successive passage through a series of gates) may be obtained by using parts of conventional integrated circuits such as type 7420 and/or 9L00 as should be apparent to those in the art.

A further feature of this invention involves the calibrate switch 156. When this switch is moved from the OFF to the ON position, the control program devices are effectively bypassed and the distance pulses 40 are directly input to the decade counter 158. Accordingly, if the wheel 100 is then traversed over a known distance, such as 1,000 of the basic units of measurement, then the average arbitrary increment of distance represented by each distance pulse 40 may be very accurately determined for use in calculating the required number N to be set on the program switches 144 to cause an accurate readout for that particular measurement wheel with its particular end unique sensible indexing marks, etc., in a particular desired basic unit of measurement.

Furthermore, the input to the accumulator stage 136 also includes a hold switch 176 which, when moved from the OFF to the ON position removes all input from the counting and accumulating stages thus holding the then existing contents in the display units 160 and 168 so that the operator may take down the final distance measurement. Of course, the same effect may be obtained by merely stopping the measurement wheel 100 thereby preventing any further distance pulses 40 from being formed.

Thus, a very versatile and programmable distance measuring instrument has been described which permits highly accurate distance measurements to be made in any desired basic unit of measurement. Furthermore, the programmable feature also permits accurate calibration of the device to compensate for variations in the placement of the sensible index marks and/or tire inflation differences, etc., which may exist between different vehicle and/or other measurement wheels with which the processing and computation apparatus is employed. The sensor 104 and the sensible index marks 102 might be permanently mounted on several vehicles owned by a particular company and then a smaller number of actual computing units might be merely plugged into connection with the existing sensor, etc., on a particular vehicle thus conserving the total instrument investment necessary for that particular company's needs. Accordingly, it will be seen that some means for rapidly and accurately calibrating the computational apparatus to the input sensor for that particular vehicle is highly desirable. This instrument provides a highly accurate and easy apparatus and method both for calibrating the measuring instrument to a particular input apparatus and also for causing the readout to occur in any desired basic unit of measurement.

Those skilled in the art will recognize that many changes may be made in this exemplary embodiment without materially departing from the spirit of the invention. Accordingly, it is noted that the embodiment discussed above is given only for purposes of explanation and that all obvious modifications within the basic spirit of the disclosure are intended to be included within this invention.

What is claimed is:

1. A variably programmable electronic distance measuring instrument for accumulating arbitrary distance increments in terms of any desired unit of distance measurement comprising:

a rotatable wheel having an unknown circumference dimension adapted for traversing distances, input means adapted to cooperate with said rotatable wheel for repetitively producing electrical distance pulses, each of said distance pulses representing an arbitrary unknown but relatively fixed increment of distance or length traversed by said wheel under constant measurement conditions such as wheel speed, variably adjustable programmable control means connected to said input means for producing a variable preselectable number of electrical clock pulses in response to each occurrence of one of said distance pulses, said preselectable number being variably selectable to represent the magnitude of said increment of arbitrary unknown distance or length in accordance with any desired arbitrary basic unit of distance measurement, and accumulator and display means connected to receive and accumulate said clock pulses from said programmable control means whereby digital data is provided and visibly displayed which data represents a total measured distance or length traversed by said wheel comprising a plurality of said arbitrary unknown increments which is directly displayed in terms of said desired basic unit of distance measurement, said variably adjustable programmable control means comprising:

clock means for producing clock pulses at a repetition rate that is high compared to the maximum expected repetition rate of said distance pulses, digital counter means connected to count said clock pulses, variably adjustable program means for presetting digital data therein representing said variably preselectable number, start/stop control means connected for enabling said digital counter means in response to each received distance pulse and for resetting and disabling said digital counter means in response to detected coincidence between the preset data in said program means and the instantaneous contents of said digital counter means, and clock means connected to said clock means and to said start/stop control means for passing clock pulses therethrough only while said digital counter means is enabled thereby passing said preselectable number of clock pulses.

2. A programmable electronic distance measuring instrument as in claim 1 wherein said input means comprises:

a plurality of sensible index marks disposed at angular intervals about said wheel, which wheel is adapted for travel over a distance or length to be measured, sensor means mounted near said wheel for sensing the passage of said index marks thereby during the travel of said wheel and for producing said distance pulses in response thereto.

3. A programmable electronic distance measuring instrument as in claim 2 further comprising:

signal processing means connected to an output of said sensor for amplifying, noise filtering and pulse shaping said distance pulses to provide a relatively uniformly dimensioned distance pulses for utilization by said programmable control means.

4. A programmable electronic distance measuring instrument as in claim 1 wherein:

said program means comprises a plurality of presettable switches individually connected to predetermined outputs of said digital counter means, and said start/stop control means comprises:

bistable means connected to be triggered to a first state by said distance pulses and to simultaneously enable said digital counter means and said clock gate means while in said first state, and coincidence gate means connected to said presettable switches for producing a reset output when said coincidence occurs and for triggering said bistable means to its second state in response thereto whereby both said digital counter means and said clock gate means are disabled.

5. A programmable electronic distance measuring instrument as in claim 1 further including:

hold switch means for temporarily preventing further change in the contents of said accumulator means by preventing further input thereto.

6. A programmable electronic distance measuring instrument as in claim 1 wherein said accumulator means comprises:

first digital counting means for counting a predetermined number of said clock pulses corresponding to one of said desired basic units of measurement and for producing an output pulse in response thereto, second counting means connected to receive said output pulses corresponding to said desired basic unit of measurement for counting and storing an accumulated number of such pulses, and display means connected to display the contents of said second counting means.

7. A programmable electronic distance measuring instrument as in claim 6 wherein said first digital counting means comprises a plurality of cascaded stages connected to cyclically count $X$ pulses and provide one carryout pulse for each $X$ pulses counted as said output pulse whereby each clock pulse is representative of $1/X$ of said desired basic unit of measurement.

8. A programmable electronic distance measuring instrument as in claim 6 wherein said second counting means comprises:
  a units counter stage for directly counting and accumulating said output pulses whereby the contents of the units counter stage directly represents the currently measured number of said basic units of measurement,
  carryover gate detectors connected to detect a predetermined contents of said basic counter stage representing a predetermined multiple number of said basic units of measurement and for producing a carry pulse in response thereto, and
  a further counter stage for counting and accumulating said carry pulses whereby the further counter stage contents directly represents the measured number of said predetermined multiples.

9. A variably programmable electronic distance measuring instrument for accumulating arbitrary distance increments in terms of any desired unit of distance measurement comprising:
  a rotatable wheel having an unknown circumference dimension adapted for traversing distances,
  input means adapted to cooperate with said rotatable wheel for reptitively producing electrical distance pulses, each of said distance pulses representing an arbitrary unknown but relatively fixed increment of distance or length traversed by said wheel under constant measurement conditions such as wheel speed,
  variably adjustable programmable control means connected to said input means for producing a variable preselectable number of electrical clock pulses in response to each occurrence of one of said distance pulses, said preselectable number being variably selectable to represent the magnitude of said increment of arbitrary unknown distance or length in accordance with any desired arbitrary basic unit of distance measurement,
  accumulator and display means connected to receive and accumulate said clock pulses from said programmable control means whereby digital data is provided and visibly displayed which data represents a total measured distance or length traversed by said wheel comprising a plurality of said arbitrary unknown increments which is directly displayed in terms of said desired basic unit of distance measurement, and
  calibrate switch means for effectively bypassing said programmable control means and for effectively passing said distance pulses directly to said accumulator means in a calibrate mode whereby the number of distance pulses occurring over a known distance may be directly obtained for use in determining the preselectable number necessary to result in distance measurement calibrated for any desired basic measurement unit.

10. A method for digitally measuring and displaying distances traversed by a wheeled vehicle in a desired unit of measure which may be adjustably altered to work with arbitrary vehicle wheel sizes and other desired units of measure, said method comprising:
  generating electrical distance pulses as a function of distance actually traversed by said vehicle, each of said distance pulses representing substantially equal increments of traversed distance, the actual value of said increments being arbitrary to the extent it depends upon particular vehicle parameters such as wheel sizes,
  electrically multiplying the number of said distance pulses by a factor N which is adjustable in arbitrary small digital increments over a broad range,
  adjusting the factor N beforehand to produce output pulses which are each representative of a predetermined fraction of the desired unit of measure as a function of the magnitude of said arbitrary but substantially equal increments of traversed distance represented by each of said distance pulses,
  electrically dividing the number of said output pulses by said predetermined fraction to produce further pulses representative of distance traversed by said vehicle according to said desired unit of measure,
  automatically counting the number of said further pulses, and
  displaying the accumulated result of said counting step as the distance traversed by said vehicle in terms of said desired unit of measure,
  said adjusting step comprising:
    counting the number of distance pulses produced by the vehicle's traverse of a distance X known in terms of said desired unit of measure,
    determining the average number of said predetermined fractions of the desired unit of measure per distance pulse, and
    adjusting N to substantially equal said average number.

11. A method as in claim 10 wherein said generating step comprises:
  applying machine-sensible index marks at regular intervals about a non-driven wheel of said vehicle,
  sensing the passage of said index marks past a sensor fixedly mounted with respect to said non-driven wheel and
  producing an electrical distance pulse in response to each such sensed passage of an index mark.

12. A method as in claim 10 wherein said electrically multiplying step comprises gating N clock pulses in response to each distance pulse, said clock pulses occurring at a rate in excess of N times the highest expected rate of said distance pulses.

13. A method as in claim 10 wherein said last-mentioned counting step is performed while said vehicle is traveling at approximately the same speed that is to be utilized during an actual measurement.

* * * * *